US009180757B2

(12) United States Patent
Huber et al.

(10) Patent No.: US 9,180,757 B2
(45) Date of Patent: Nov. 10, 2015

(54) VEHICLE MODULAR UPPER-DOOR ASSEMBLY

(71) Applicant: Ford Global Technologies, LLC, Dearborn, MI (US)

(72) Inventors: Mathias A. Huber, Brighton, MI (US); David Arthur Wade, Plymouth, MI (US); Paul Elia, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 13/789,836

(22) Filed: Mar. 8, 2013

(65) Prior Publication Data
US 2014/0252796 A1    Sep. 11, 2014

(51) Int. Cl.
| | |
|---|---|
| *B60J 5/04* | (2006.01) |
| *B60J 1/17* | (2006.01) |
| *B60J 10/04* | (2006.01) |
| *B62D 65/02* | (2006.01) |
| *B62D 63/02* | (2006.01) |
| *B60J 10/08* | (2006.01) |

(52) U.S. Cl.
CPC .............. *B60J 5/0406* (2013.01); *B60J 5/0402* (2013.01); *B60J 5/0408* (2013.01); *B60J 10/041* (2013.01); *B60J 10/042* (2013.01); *B62D 65/02* (2013.01); *B60J 10/085* (2013.01); *B62D 63/025* (2013.01); *Y10T 29/49622* (2015.01)

(58) Field of Classification Search
CPC ................ B60J 1/007; B60J 1/08; B60J 1/17; B60J 1/10; B60J 5/0402; B60J 5/0406; B60J 5/0408; B60J 5/0411; B60J 5/0463; B60J 5/0465; B60J 5/0466

USPC ................... 296/146.2, 146.5, 146.9, 146.15, 296/146.16; 49/348, 440, 441, 502, 506
See application file for complete search history.

(56) References Cited

U.S. PATENT DOCUMENTS

| | | | | |
|---|---|---|---|---|
| 5,174,066 | A * | 12/1992 | Dupuy | ............................ 49/502 |
| 5,702,148 | A * | 12/1997 | Vaughan et al. | ........... 296/146.9 |
| 5,746,471 | A * | 5/1998 | Teramoto et al. | .......... 296/146.1 |
| 5,964,063 | A * | 10/1999 | Hisano et al. | .................... 49/502 |
| 6,039,384 | A * | 3/2000 | Schulte et al. | ............. 296/146.2 |
| 8,192,671 | B2 | 6/2012 | Coldre et al. | |
| 2007/0262607 | A1 | 11/2007 | Saito | |
| 2008/0127569 | A1* | 6/2008 | Boddy et al. | ..................... 49/502 |
| 2009/0015035 | A1* | 1/2009 | Baumgart et al. | ......... 296/146.2 |
| 2012/0124912 | A1* | 5/2012 | Okada et al. | ..................... 49/501 |
| 2012/0242107 | A1* | 9/2012 | Sachdev et al. | ............. 296/146.2 |

FOREIGN PATENT DOCUMENTS

WO       WO 0216154 A1 *  2/2002

* cited by examiner

*Primary Examiner* — Jason S Daniels
(74) *Attorney, Agent, or Firm* — Raymond Coppiellie; Brooks Kushman P.C.

(57) ABSTRACT

A modular upper-door assembly including a standard geometric corner component and a standard geometric B-pillar component for all vehicle model doors. Each header, belt and window-track has a different length and bend geometry for each vehicle model door while each respective component shares a standard geometric cross-section. All headers may connect to the corner component and B-pillar component in the same locations for each vehicle model door. All belts may connect to the corner component in the same location for each vehicle model door, but the attachment location on the B-pillar may vary from vehicle to vehicle. A stationary-glass or mirror-sail may also be overmolded into the assembly.

20 Claims, 5 Drawing Sheets

VEHICLE MODULAR UPPER-DOOR ASSEMBLY

TECHNICAL FIELD

This disclosure relates to upper-door assemblies for vehicles, specifically to modular upper-door assemblies for automobiles in which assemblies share standard geometric corner and B-pillar components.

BACKGROUND

Automobile doors have typically been manufactured to have a daylight opening in the upper portion of the door. The daylight opening allows the occupants inside the vehicle to see outside of the vehicle. A drop-glass has been used to cover the daylight opening and move up and down within the lower portion of the door allowing the daylight opening to be opened and closed.

Most vehicles have unique designs with differing sized doors and differing sized daylight opening within the doors. To match the paint of the door with the other exterior body components, the doors are often painted at the same time as the body. The drop-glass and surrounding componentry used to secure and operate the drop-glass are also installed at the final assembly location of the vehicle body, usually after the painting process. As a result, there are multiple components with multiple part numbers driving additional complexity into the final assembly of the vehicle, and thus additional opportunity for errors to be made.

Methods of pre-assembling upper-door assemblies to be mated with lower-door assemblies have been attempted to reduce the additional complexity at the final assembly plant. These pre-assemblies have no modularity of the components, and in essence only transfer the additional complexity of the multiple components outside of the final assembly plant to another location. U.S. published application US 2007/0262607 A1 to Saito discloses an example of such a method of assembling door parts.

The above problem(s) and other problems are addressed by this disclosure as summarized below.

SUMMARY

One aspect of this disclosure is directed to a modular upper-door assembly having a standard geometric corner component and a standard geometric B-pillar component with a header and a belt each connected to and extending between the standard geometric corner and B-pillar components. A drop-glass is partially framed by the header and the B-pillar component. The header, belt and drop-glass are capable of having varying geometries and cooperating with the standard geometric corner and B-pillar components to define varying sized daylight openings for a number of different vehicles.

According to another aspect of this disclosure, a method of manufacturing a modular upper-door assembly having standard geometric corner and B-pillar components for multiple vehicle models is disclosed. The method includes selecting a header and a belt corresponding to a vehicle model. Connecting the header to upper connection regions of the corner and B-pillar components. Connecting the belt to lower connecting regions of the corner and B-pillar components, wherein the belt is connected to the B-pillar component at a location corresponding to the vehicle model.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
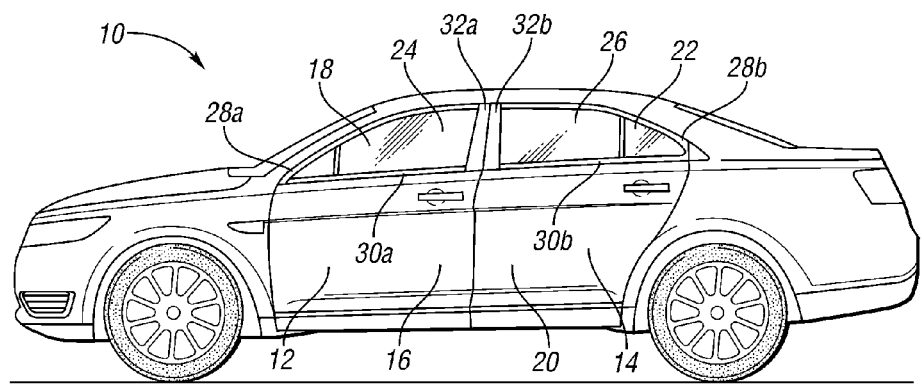
FIG. 1 is a side view of a car having front and rear doors each with a daylight opening.

FIG. 1 is a side view of a vehicle 10 having a front door 12 and a rear door 14. The front door 12 is made up of a front lower-door assembly 16 and a front upper-door assembly 18. The rear door 14 is made up of a rear lower-door assembly 20 and a rear upper-door assembly 22. The front and rear upper-door assemblies 18, 22 define a first daylight opening 24 and a second daylight opening 26, respectively. The upper-door assemblies 18, 22 are shown assembled to the lower-door assemblies 16, 20 to make up the full doors 12, 14. This figure shows the vehicle 10 in its final production phase complete with front and rear header trims 28a, 28b, front and rear belt trims 30a, 30b, and front and rear B-pillar trims 32a, 32b. The trims 28a, 28b, 30a, 30b, 32a, 32b may be connected to portions of the upper-door assemblies 18, 22. Front and rear belt trims 30a, 30b may be connected to portions of the lower-door assemblies 16, 20. Alternatively, the upper-door assemblies 18, 22 may be provided with components having a class A surface that do not require trim pieces to be added. A class A surface is one that is visible to a person and has aesthetic quality characteristics, such as having no visible defects like dimples, blemishes, sinks, or marks when viewed to the naked eye (e.g., without magnification). The class A surface may also include optional surface treatments for high/low gloss, chrome, satin chrome, or cosmetic films.

Vehicles come in varying shapes and sizes with varying geometries for doors 12, 14 and varying geometries for the daylight openings 24, 26. Modular upper-door assemblies 16, 18 may share common standard geometry componentry, as will be described below, while allowing some of the components to change in length and bend to accommodate multiple vehicle models. Modular, as used here, means that some of the components may be the same for all assemblies, while other components may be interchanged in the same relationship to change the size and shape of the upper-door assemblies 18, 22. The interchangeable components being specific and unique for different vehicle models and doors.

Figure 2:
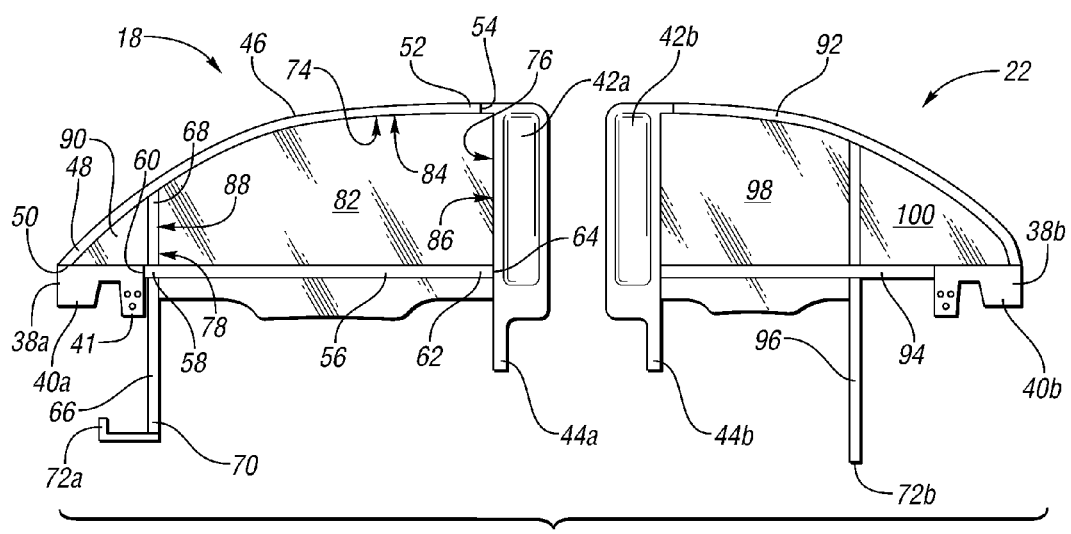
FIG. 2 is a side view of a front and rear modular upper-door assembly for the car shown in FIG. 1.

FIG. 2 is a side view of modular front and rear upper-door assemblies 18, 22 without trim pieces 28a, 28b, 30a, 30b, 32a, 32b and before being assembled to the lower-door assemblies 16, 20. The modular front upper-door assembly 18 has a corner component 38a with a standard geometric shape that may be used in all of the modular front upper-door assemblies 18, regardless of door or daylight opening geometry. The corner component 38a may be universal such that the same piece may be used on left and right doors 12, or the corner component 38a may have a standard geometry with mirrored left-hand and right-hand components to accommodate the left and right doors 12, respectively. The corner component 38a provides a first door-attachment point 40a capable of being attached to a front lower-door assembly 16. The corner component 38a may also provide a mirror attachment point 41 to support a mirror (not shown) on the exterior of the front lower-door assembly 16. The corner component 38a may be a cast aluminum part.

The modular front upper-door assembly 18 also has a B-pillar component 42a with a standard geometric shape that may be used in all of the modular front upper-door assemblies 18, regardless of door or daylight opening geometry. The B-pillar component 42a may be usable on both left and right doors 12, or the B-pillar component 42a may have a standard geometry with mirrored left-hand and right-hand components to accommodate the left and right doors 12, respectively. The B-pillar component 42a provides a second door-attachment point 44a capable of being attached to a front lower-door assembly 16. The B-pillar component 42a may be a cast aluminum part.

A header 46 is shown having a first proximal end 48 connected to the corner component 38a at a first header-connection location 50. The header 46 also has a first distal end 52 connected to the B-pillar component 42a. The header 46 is connected to the B-pillar component 42a at a second header-connection location 54. The header 46 may be an extruded aluminum part with a standard cross-sectional geometry (see FIG. 6) for all of the modular front upper-door assemblies 18, with the longitudinal length and bend of the header 46 being different for each vehicle model and daylight opening geometry as necessary. The header 46 may also use the standard cross-sectional geometry from the left-hand to right-hand side of the vehicle by bending the header 46 to the same shape from the opposite end, resulting in a mirrored component. The header 46 may maintain a fixed first and second header-connection locations 50, 54 on to the corner and B-pillar components 38a, 42a regardless of longitudinal length and bend geometry for each modular front upper-door assembly 18.

A belt 56 is shown having a second proximal end 58 connected to the corner component 38a at a first belt-connection location 60. The belt 56 also has a second distal end 62 connected to the B-pillar component 42a. The first belt-connection location 60 may be located on an adjacent edge of the corner component 38a from the first header-connection location 50. The belt 56 and header 46 may extend from the corner component 38a defining an acute angle there between. The belt 56 is connected to the B-pillar component 42a at a second belt-connection location 64. The second belt-connection location 64 may be located on the same edge of the B-pillar component 42a as the second header-connection 54. The second belt-connection location 64 is offset from the second header-connection location 54, such that the header 46 and belt 56 are offset from each other at their respective distal ends 52, 62.

The belt 56 may be an extruded aluminum part with a standard cross-sectional geometry (see FIG. 7) for all of the modular front upper-door assemblies 18, with the longitudinal length and potential bend of the belt 56 being different for each vehicle model and daylight opening geometry as necessary. The belt 56 may maintain the same first belt-connection location 60 on corner components 38a, regardless of longitudinal length and bend geometry, however the second belt-connection location 64 on the B-pillar component 42a may vary in location for each modular front upper-door assembly 18.

A window-track 66 has an upper end 68 connected to the header 46. The window-track 66 extends from the header 46 past the belt 56 to a lower end 70. The lower end 70 of the window-track 66 may provide a third door-attachment point 72a capable of being attached to the front lower-door assembly 16. The window-track 66 may be an extruded aluminum part with a standard cross-sectional geometry (not shown) for all of the modular front upper-door assemblies 18, with the vertical length being different for each vehicle model and daylight opening geometry as necessary.

The header 46 defines at least a portion of a first drop-glass channel 74. The header 46 may define the entire first drop-glass channel 74 or in combination with the header trim piece 28a (see FIG. 6). The B-pillar component 42a defines at least a portion of a second drop-glass channel 76. The B-pillar component 42a may define the entire second drop-glass channel 76 or in combination with the B-pillar trim piece 32a, similar to the header 46 and header trim piece 28a combination. The window-track 66 defines a third drop-glass channel 78. The upper-door assembly 18, when connected to the lower-door assembly 16, may have surfaces which are visible from the exterior of the vehicle 10 with a class A appearance such that they do not require trim pieces 28a, 32a. The corner component 38a, belt 56, and lower portion of the B-pillar component 42a may also be hidden behind the front lower-door assembly 16 and not visible from the exterior when on the vehicle 10.

A drop-glass 82 is partially framed by the header 46, B-pillar component 42a, and window-track 66. A first portion 84 of the drop-glass 82 may be framed within the first drop-glass channel 74, a second portion 86 of the drop-glass 82 may be framed within the second drop-glass channel 78, and a third portion 88 of the drop-glass 82 may be framed within the third drop-glass channel 78. The B-pillar component 42a and window-track 66 therefore cooperate to slideably support the drop-glass 82. The drop-glass 82 may have varying geometries to correspond with the varying daylight openings 24 of multiple vehicle models. One or more drop-glass channel seals 80 (see FIG. 6) may be disposed within the first, second and third drop-glass channels 74, 76, 78 to aid in the slideable support of the drop-glass 82.

A stationary-glass 90 may be at least partially framed by the corner component 38a, header 46 and window-track 66. The stationary-glass 90 may be framed by the surrounding components defining stationary-glass channels (not shown) similar to the drop-glass channels 74, 76, 78. One or more stationary-glass channel seals (not shown) may be disposed in the stationary-glass channels. The stationary-glass 90 may also be molded to or within the surrounding components.

The modular rear upper-door assembly 22 is similar to the modular front upper-door assembly 18. A rear corner component 38b may be identical in geometric shape to the corner component 38a. Alternatively, the rear corner component 38b and front corner component 38a may differ in geometry compared to each other, but each may be a standard geometry from vehicle to vehicle. The rear corner component 38b may be universal from left to right doors 14, or the rear corner component 38b may have a standard geometry with mirrored left-hand and right-hand components to accommodate the left and right doors 14, respectively. The rear corner component 38b provides a first door-attachment point 40b capable of being attached to a rear lower-door assembly 20. The rear corner component 38b may also be a cast aluminum part.

The modular rear upper-door assembly 22 also has a rear B-pillar component 42b with a standard geometric shape that may be used in all of the modular rear upper-door assemblies 22, regardless of door or daylight opening geometry. The rear B-pillar component 42b may be used on both front to rear doors 12, 14 and have the same geometry as the B-pillar component 42a. The rear B-pillar component 42b may have a different geometry from B-pillar component 42a, but be universal for all rear upper-door assemblies 22 across various vehicle models. The rear B-pillar component 42b may also have a standard geometry with mirrored left-hand and right-hand components to accommodate the left and right doors 14, respectively. The rear B-pillar component 42b provides a second door-attachment point 44b capable of being attached to a rear lower-door assembly 20. The rear B-pillar component 42b may also be a cast aluminum part.

A rear header 92 is connected to and disposed between the rear corner component 38b and the rear B-pillar component 42b similar to that of the header 46 in the front upper-door assembly 18. The rear header 92 may be an extruded aluminum part with a standard cross-sectional geometry the same as header 46 (see FIG. 6). The rear header 92 may require a different longitudinal length and bend geometry from the header 46 for the second daylight opening 26, and be different for each vehicle model and daylight opening geometry as necessary.

A rear belt 94 is connected to and disposed between the rear corner component 38b and the rear B-pillar component 42b similar to that of the belt 56 in the front upper-door assembly 18. The rear belt 94 and rear header 92 may connect to and extend from adjacent edges of the rear corner component 38b defining an angle there-between which may range from acute to obtuse depending on the rear door 14 and daylight opening geometry. The rear belt 92 may be an extruded aluminum part with a standard cross-sectional geometry the same as belt 56 (see FIG. 7). The longitudinal length and bend geometry of the rear belt 92 may be different for each vehicle model and daylight opening geometry as necessary.

A rear window-track 96 is connected to the rear header 92 and extends past the rear belt 94. The rear window-track 96 may provide a third door-attachment point 72b for the rear lower-door assembly 20. The rear window-track 96 may be an extruded aluminum part with the same standard cross-sectional geometry as the window-track 66 and for all of the modular front and rear upper-door assemblies 18, 20 with the vertical length being different for each vehicle model and daylight opening geometry as necessary.

A rear drop-glass 98 is partially framed by the rear header 92, rear B-pillar component 42b, and rear window-track 96. The rear B-pillar component 42b and rear window-track 66 cooperate to slideably support the rear drop-glass 98. A rear stationary-glass 100 may be at least partially framed by the rear corner component 38b, rear header 92 and rear window-track 72b. The rear drop-glass 98 and stationary-glass 100 may be framed by the surrounding components within the drop-glass and stationary-glass channels, repectively, with one or more channel seals disposed between the glass and the channel (see FIG. 7). The rear stationary-glass 100 may be molded to or within the surrounding components.

Figure 3:
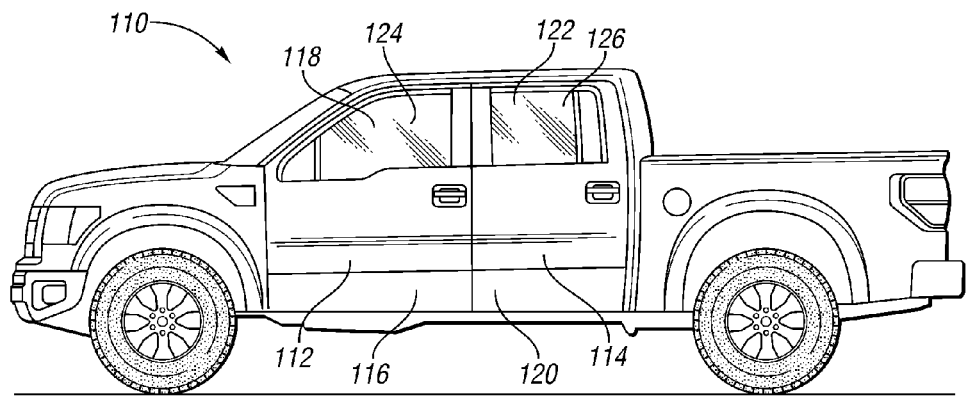
FIG. 3 is a side view of a truck having front and rear doors each with a daylight opening.

FIG. 3 shows a side view of a vehicle 110 having a front door 112 and a rear door 114. The reference numbers increase by 100 to represent similar components as used on vehicle 10 in FIGS. 1 and 2, while showing that the components are different in size and shape for vehicle 110. The front door 112 is made up of a front lower-door assembly 116 and a front upper-door assembly 118. The rear door 114 is made up of a rear lower-door assembly 120 and a rear upper-door assembly 122. The front and rear upper-door assemblies 118, 122 define a third daylight opening 124 and a fourth daylight opening 126, respectively. The third and fourth daylight openings 124, 126 may have different geometries from the first and second daylight openings 24, 26. The upper-door assemblies 118, 122 are shown assembled to the lower-door assemblies 116, 120 to make up the full doors 112, 114. This figure shows the vehicle 110 in its final production phase with no trim pieces necessary on the upper-door assemblies 116, 118.

Figure 4:
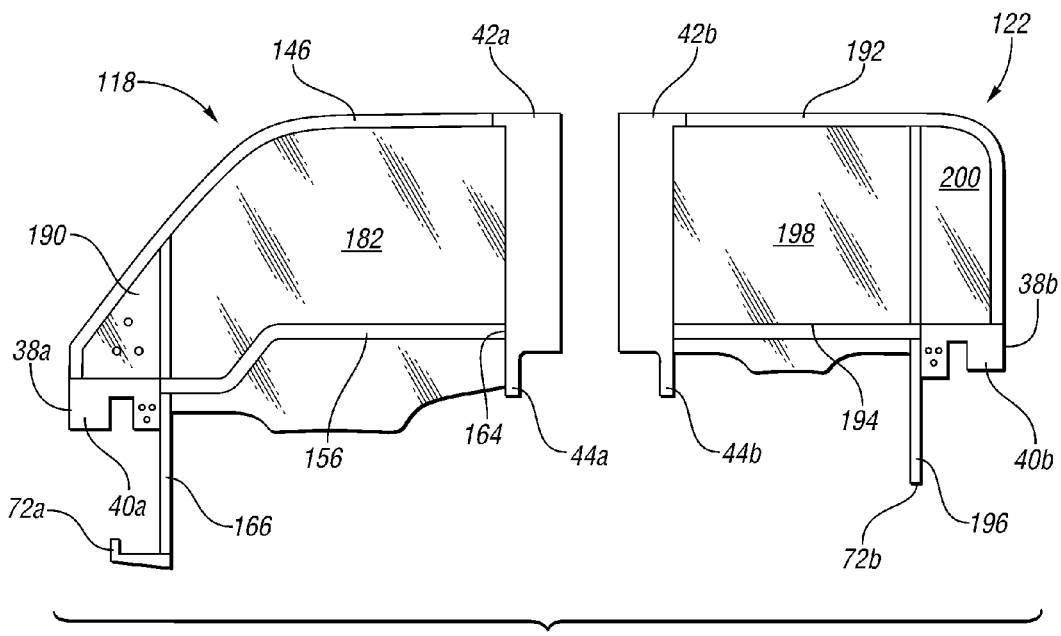
FIG. 4 is a side view of a front and rear modular upper-door assembly for the truck shown in FIG. 3.

FIG. 4 shows a side view of modular front and rear upper-door assemblies 118, 122 before being assembled to the lower-door assemblies 116, 120. The modular front upper-door assembly 118 has a corner component 38a with a standard geometric shape that may be used in all of the modular front upper-door assemblies 18, 118 regardless of door or daylight opening geometry. The corner component 38a provides a first door-attachment point 40a capable of being attached to a front lower-door assembly 116.

The modular front upper-door assembly 118 also has a B-pillar component 42a with a standard geometric shape that may be used in all of the modular front upper-door assemblies 18, 118 regardless of door or daylight opening geometry. The B-pillar component 42a provides a second door-attachment point 44a capable of being attached to a front lower-door assembly 116. The B-pillar component 42a may have a class A exterior surface that does not require B-pillar trim 32a (see FIG. 1).

A header 146 is shown connected to and disposed between the corner component 38a and the B-pillar component 42a similar to that of the header 46 in the front upper-door assembly 18. The header 146 may be an extruded aluminum part with a standard cross-sectional geometry for all of the modular front upper-door assemblies 18, 118. The header 146 may require a different longitudinal length and bend from the header 46 for the third daylight opening 124, and be different for each vehicle model and daylight opening geometry as necessary. The header 146 may have a class A exterior surface that does not require header trim 28a (see FIG. 1).

A belt 156 is shown connected to and disposed between the corner component 38a and the B-pillar component 42a similar to that of the belt 56 in the front upper-door assembly 18. The belt 156 is connected to the B-pillar component 42a at a third belt-connection location 164. The third belt-connection location 164 may be in a different location on the B-pillar component 42a from the second belt-connection location 64 (see FIG. 2) to accommodate for the third daylight opening 124 having a different geometry from the first daylight opening 24. The belt 156 may have a class A exterior surface that does not require belt trim 30a (see FIG. 1). The belt 156 may also be hidden by the front lower-door assembly 116 when installed, and thus does not require belt trim 30a when assembled to the vehicle 110.

A window-track 166 is shown connected to the header 146 and extending past the belt 156. The window-track 166 may provide a third door-attachment point 72a for the front lower-door assembly 116. The window-track 166 may be an extruded aluminum part with the same standard cross-sectional geometry as the window-track 66 and for all of the modular front upper-door assemblies 18, 118 with the vertical length being different for each vehicle model and daylight opening geometry as necessary. The window-track 166 may have a class A exterior surface that does not require a trim.

A drop-glass 182 is partially framed by the header 146, B-pillar component 42a, and window-track 166. The B-pillar component 42a and window-track 166 cooperate to slideably support the drop-glass 182. One of more drop-glass channel seals 80 (see FIG. 7) may be disposed between the drop-glass 182 and the header 146, B-pillar component 42a, and window-track 166.

A mirror-sail 190 may be at least partially framed by the corner component 38a, header 146 and window-track 166. The mirror-sail 190 may be framed by the surrounding components defining mirror sale channels with one or more mirror sale channel seals (not shown) disposed in the mirror sale channels, or the mirror-sail 190 may be molded to or within the surrounding components.

The modular rear upper-door assembly 122 is similar to the modular front upper-door assembly 118 in that a rear corner component 38b may be identical in geometric shape to the corner component 38a, or may be a unique corner component with a standard geometry for all rear upper-door assemblies 22, 122. The rear corner component 38b may be universal from left to right doors 114, or the rear corner component 38b may have a standard geometry with mirrored left-hand and right-hand components to accommodate the left and right doors 114, respectively. The rear corner component 38b provides a first door-attachment point 40b capable of being attached to a rear lower-door assembly 120.

The modular rear upper-door assembly 122 has a rear B-pillar component 42b with a standard geometric shape that may be used in all of the modular upper-door assemblies 18, 118, 22, 122. The rear B-pillar component 42b may have a different geometry from B-pillar component 42a, but be universal for all rear upper-door assemblies 22, 122. The rear B-pillar component 42b may have a class A exterior surface that does not require trim, and may also have a standard geometry with mirrored left-hand and right-hand components to accommodate the left and right rear doors 114, respectively. The rear B-pillar component 42b provides a second door-attachment point 44b capable of being attached to a rear lower-door assembly 120.

A rear header 192 is shown connected to and disposed between the rear corner component 38b and the rear B-pillar component 42b. The rear header 192 may be an extruded aluminum part with a standard cross-sectional geometry the same as header 146, as well as headers 46, 92. The rear header 192 may require a different longitudinal length and bend from the header 146 for the fourth daylight opening 126, and be different for each vehicle model and daylight opening geometry as necessary. The rear header 192 may have a class A exterior surface that does not require any trim and may be bent opposite to accommodate left-hand and right hand assemblies.

A rear belt 194 is shown connected to and disposed between the rear corner component 38b and the rear B-pillar component 42b. The rear belt 92 may be an extruded aluminum part with a standard cross-sectional geometry the same as belt 156, as well as belts 56, 94. The longitudinal length and potential bend of the rear belt 194 may be different for each vehicle model and daylight opening geometry as necessary. The rear belt 194 may have a class A exterior surface that does not require trim. The rear belt 194 may be hidden by the rear lower-door assembly 20 and not visable from the exterior of the vehicle 110 when in final assembly.

A rear window-track 196 is shown connected to the rear header 192 and extending past the rear belt 194. The rear window-track 196 may provide a third door-attachment point 72b for the rear lower-door assembly 120. The rear window-track 196 may be an extruded aluminum part with the same standard cross-sectional geometry as the window-track 166, as well as window-tracks 66, 96. The vertical length of the window-tracks 66, 96, 166, 196 may differ for each vehicle model and daylight opening geometry as necessary.

A rear drop-glass 198 is shown partially framed by the rear header 192, rear B-pillar component 42b, and rear window-track 196. The rear B-pillar component 42b and rear window-track 196 cooperate to slideably support the rear drop-glass 198. A rear stationary-glass 200 may be at least partially framed by the rear corner component 38b, rear header 192 and rear window-track 196. The rear stationary-glass 200 may be framed by the surrounding components within stationary-glass channels and stationary-glass channel seals or molded to the surrounding components.

Figure 5:
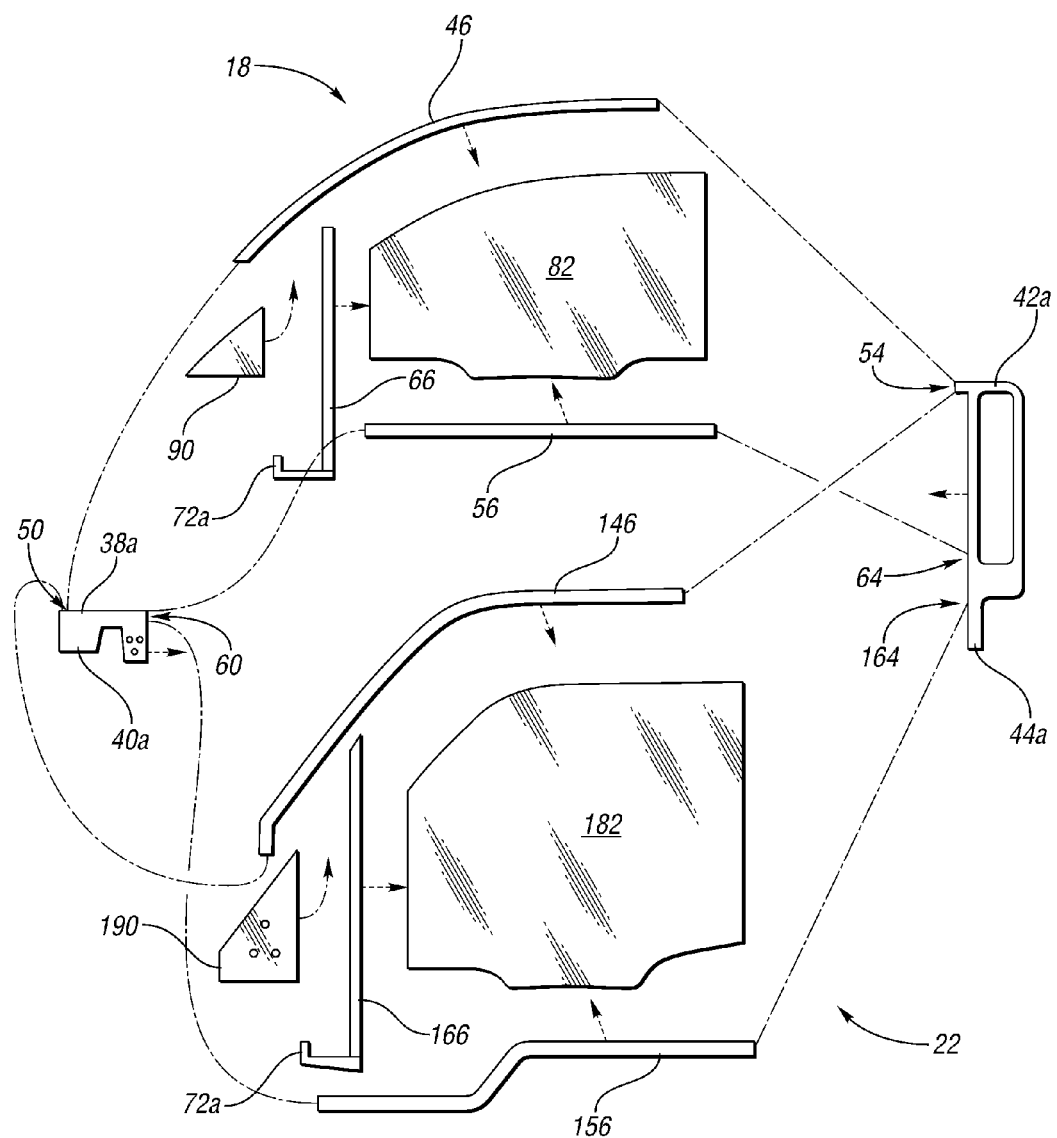
FIG. 5 is an exploded view of two different modular upper-door assemblies sharing the same standard geometric corner component and B-pillar component.

FIG. 5 is an exploded view of a front upper-door assembly 18 and 118 showing how the two assemblies are able to share a standard geometric corner component 38a and B-pillar component 42a. Either header 46 or 146 may attach to the corner component 38a at the first header-connection location 50 and the B-pillar component 42a at the second header-connection location 54. Either belt 56 or 156 mat attach to the corner component 38a at the first belt-connection location 60. The belt 56 will attach to the B-pillar component 42a at the second belt-connection 64, whereas the belt 156 will attach to the B-pillar component 42a at a second belt-connection location 164. The second belt-connection location 164 may vary from 64 to accommodate different daylight opening geometries. Either window-track 66 or 166 will connect to its respective header 46, 146 and extend past it respective belt 56, 156. Each window-track 66, 166 is capable of cooperating with the B-pillar component 42a to slideably support its respective drop-glass 82, 182. Each window-track 66, 166 is capable of cooperating with the corner component 38a to fixedly support a stationary-glass 90 or a mirror-sail 190. The corner component 38a may provide a first door-attachment point 40a and the B-pillar component 42a may provide a second door-attachment point 44a capable of being attached to either front lower-door assembly 16, 116. As well, either window-track 66 or 166 may provide the third door-attachment point 72a capable of being attached to either front lower-door assembly 16, 116.

Figure 6:
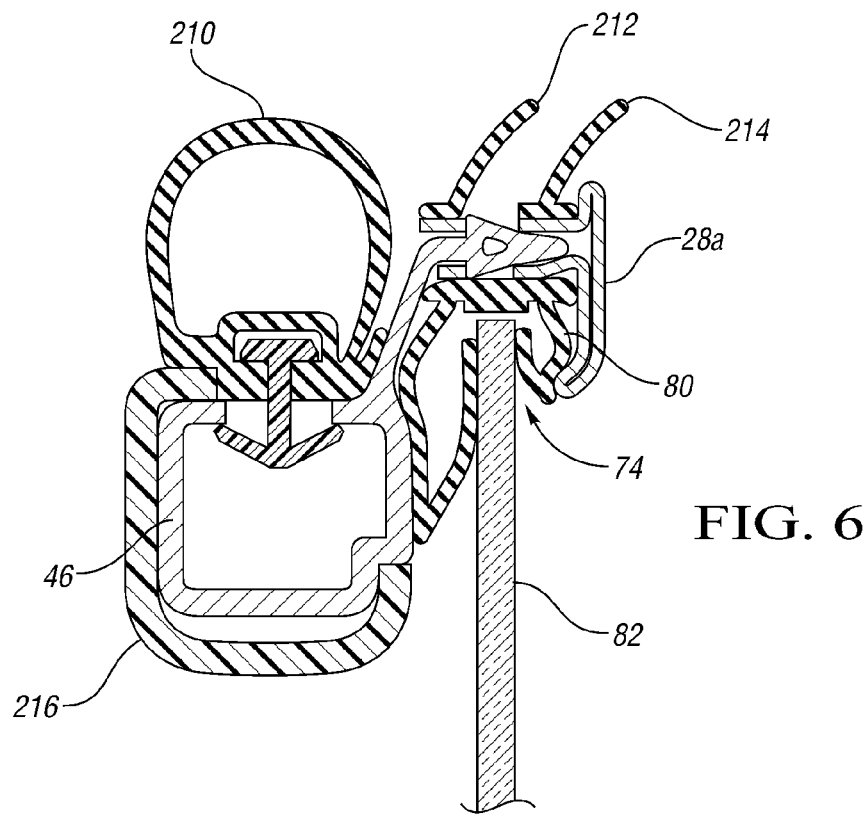
FIG. 6 is a cross-sectional view of a header with trim and seals and a portion of a drop-glass.

FIG. 6 shows a cross-sectional embodiment of header 46, in which the header 46 has a standard geometric cross-section used for all upper-door assemblies 16, 22, 116, 122 (see FIGS. 1-4). In this embodiment, a header trim piece 28a is connected to and cooperates with the header 46 to define a first drop-glass channel 74. However, the header 46 may be extruded in such a way as to not require a header trim piece 28a. A drop-glass channel seal 80 is disposed in the drop-glass channel 74, and a drop-glass 82 is partially framed by the drop-glass channel 74. The header 46 may also include a primary door-seal 210, secondary door-seals 212, 214, and interior trim 216.

Figure 7:
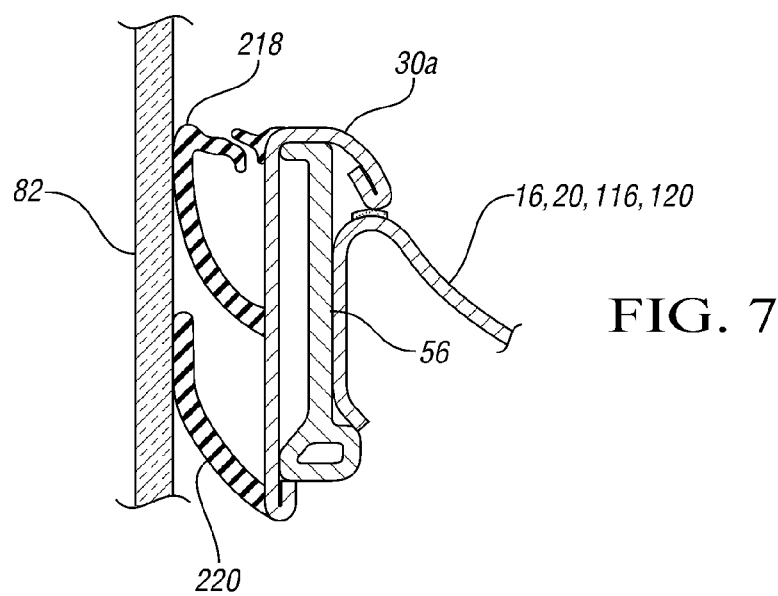
FIG. 7 is a cross-sectional view of belt with trim and seals and a portion of a drop-glass and lower-door assembly.

FIG. 7 shows a cross-sectional embodiment of a belt 56, in which the belt 56 has a standard geometric cross-section used for all upper-door assemblies 16, 22, 116, 122 (see FIGS. 1-4). In this embodiment, a belt trim piece 30a is connected to and cooperates with the belt 56 to contact a portion of the front lower-door assembly 16, although the contact could be the same with any lower-door assembly 16, 20, 116, or 120.

The belt 56 and belt trim 30a cooperate to support drop-glass seals 218, 220 which press up against the drop-glass 82 when in assembly. However, the belt 56 may be extruded in such a way as to not require a belt rim piece 30a, either because the belt 56 may have a class A surface, or because the belt 56 is installed within the lower-door assembly 16, 20, 116, 120 such that it is not visable from the exterior of the vehicle.

Figure 8:
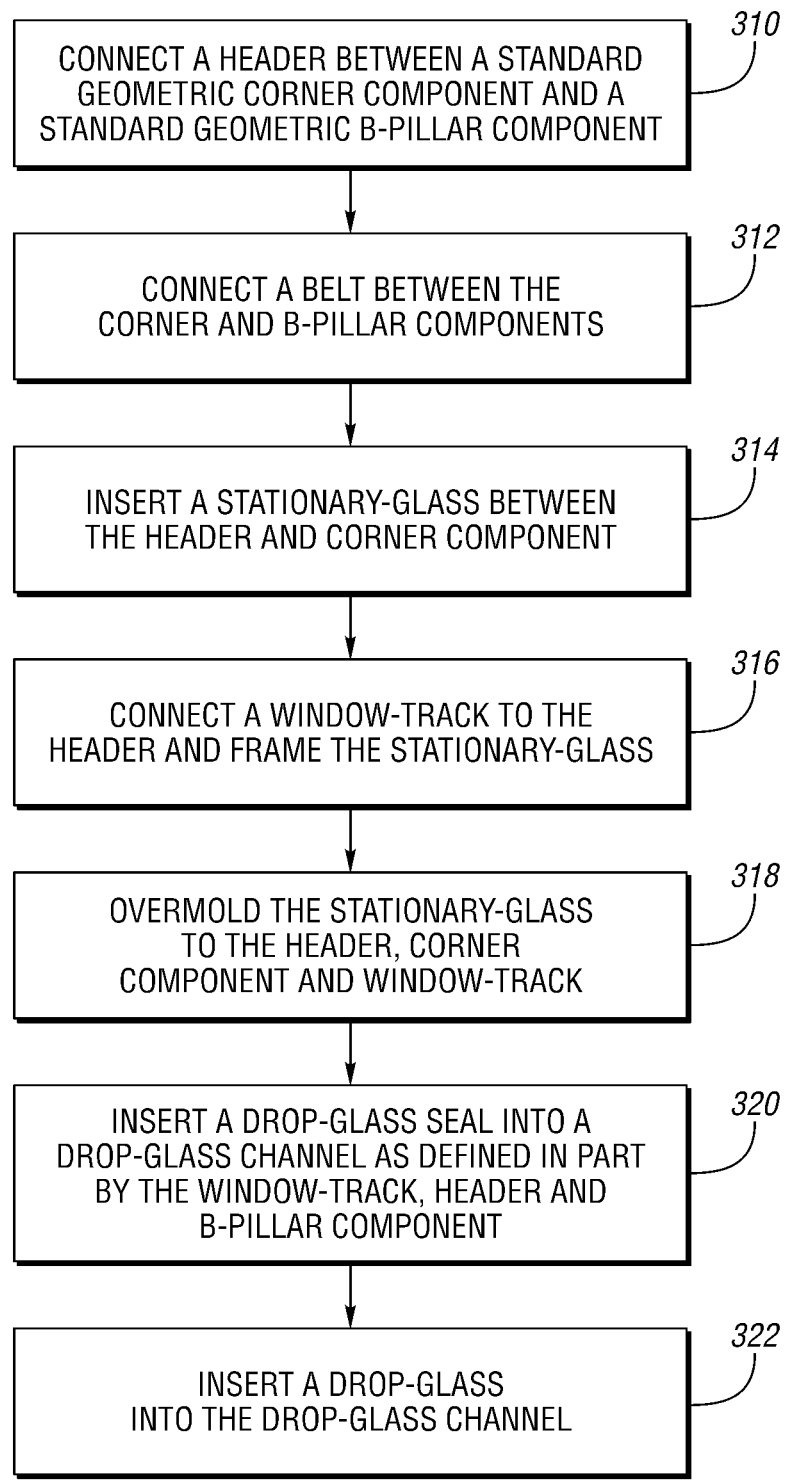
FIG. 8 is a flow chart showing a method of manufacturing a modular upper-door assembly.

FIG. 8 is flow chart detailing a method of assembling a modular upper-door assembly having standard geometric corner and B-pillar components for a specific vehicle model. At step 310, the assembler starts with standard geometric corner and B-pillar components for all vehicles regardless of the door. The assembler connects a header between the two standard geometry components. The header used corresponds to the specific vehicle model door to which the upper-assembly will be installed. All headers used may have a standard cross-sectional shape. The assembler may connect the header to fixed header-connection locations on the corner and B-pillar components regardless of the vehicle to which it will be assembled.

At step 312, the assembler connects a belt between the standard geometric corner and B-pillar components. The belt may be connected to a fixed belt-connecting location on the corner component regardless of the vehicle model door. The belt, however, may be connected at varying belt-connection locations on the B-pillar component corresponding to the vehicle model door. All belts used may have a standard cross-sectional shape. The belt, like the header, may also be specific for the vehicle model door.

At step 314, the assembler partially frames a stationary-glass between a portion of the corner component and window-track. The stationary-glass, like the header and belt may also be specific for the vehicle model door.

At step 316, the assembler connects a window-track to the header and extending it downward past the belt framing the stationary-glass. All window-tracks may have a standard cross-sectional shape. The window-track, like the header, belt and stationary-glass may be specific to the vehicle model door.

At step 318, the assembler overmolds a perimeter of the stationary-glass to at least a portion of the corner component, header, and window-track.

At step 320, the assembler inserts a drop-glass channel seal within a drop-glass channel that is at least partially defined by portions of the window-track, header, and B-pillar components. The drop-glass channel seal may have the same cross-sectional shape for all assemblies and cut to length depending on the geometry of the drop-glass channel.

At step 322, the assembler inserts a drop-glass into the drop-glass channel. The drop-glass will be specific to the vehicle model door. The drop-glass may also be temporarily fixed into place with a tear strip or other frangible tab to hold the drop-glass in the drop-glass channel during shipment of the assembly and before installation on the vehicle. The tear strip may be removed when the upper-door assembly is assembled to the lower-door assembly and a window regulator assembly holds the drop-glass in position. The order of the steps as shown in the figure is not necessarily the only order in which the modular upper-door assembly has to be assembled, and as such the steps may be logically rearranged to better suit the assembly process.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A modular upper-door assembly comprising:
   a standard geometric corner component;
   a standard geometric B-pillar component;
   a header and a belt each directly connected to and extending between the corner and B-pillar components; and
   a drop-glass partially framed by the header and the B-pillar component, wherein the header, belt and drop-glass are capable of having varying geometries and cooperating with the standard geometric corner and B-pillar components to define varying sized daylight openings.

2. The assembly of claim 1 wherein the belt and header each have respective proximal ends connected to the corner component and extend from the corner component defining an acute angle there-between.

3. The assembly of claim 1 wherein the belt and header each have respective distal ends connected to the B-pillar component offset from each other.

4. The assembly of claim 1 wherein the header defines at least a portion of a first glass channel and a first portion of the drop-glass is framed within the first glass channel.

5. The assembly of claim 4 further comprising a header trim piece connected to and cooperating with the header to define the first glass channel.

6. The assembly of claim 1 wherein the B-pillar component defines at least a portion of a second glass channel and a second portion of the drop-glass is framed within the second glass channel.

7. The assembly of claim 1 further comprising a window-track having an upper end connected to the header and extending past the belt to a lower end, the window-track defining a third glass channel and a third portion of the drop-glass is framed within the third glass channel.

8. The assembly of claim 7 wherein the header defines at least a portion of a first glass channel, the B-pillar component defines at least a portion of a second glass channel, and the header, B-pillar component and window-track cooperate to slidably support the drop-glass.

9. The assembly of claim 8 further comprising a drop-glass channel seal disposed in the first, second and third glass channels.

10. The assembly of claim 7 further comprising a stationary-glass at least partially framed by the header, window-track, and corner component.

11. The assembly of claim 10 wherein the stationary-glass is molded in position.

12. The assembly of claim 7 further comprising a mirror-sail at least partially framed by the header, window-track, and corner component.

13. The assembly of claim 1 wherein the corner component provides a first attachment point capable of being attached to a lower-door assembly.

14. The assembly of claim 1 wherein the B-pillar component provides a second attachment point capable of being attached to a lower-door assembly.

15. The assembly of claim 7 wherein the window-track provides a third attachment point capable of being attached to a lower-door assembly.

16. A method of manufacturing a modular upper-door assembly having standard geometric corner and standard B-pillar components for multiple vehicle models, the method comprising:
   selecting a first header and a first belt corresponding to a first vehicle model;

directly connecting the first header to fixed header-connection locations on a first standard geometric corner component and a first standard B-pillar component;

directly connecting the first belt to a fixed belt-connecting location on the first standard geometric corner component and at a first belt-connection location on the first standard B-pillar component corresponding to the first vehicle model;

selecting a second header and second belt corresponding to a second vehicle model;

directly connecting the second header to fixed header-connection locations on a second standard geometric corner component and a second standard B-pillar component; and directly connecting the second belt to a fixed belt-connecting location on the second standard geometric corner component and at a second belt-connection location on the second standard B-pillar component corresponding to the second vehicle model.

17. The method of claim 16 further comprising selecting a window-track corresponding to the vehicle model and connecting one end of the window-track to the header, connectedly extending the window-track past the belt substantially parallel to the B-pillar component.

18. The method of claim 17 further comprising disposing a drop-glass channel seal within a drop-glass channel at least partially defined by portions of the window-track, header, and B-pillar components.

19. The method of claim 17 further comprising selecting a drop-glass corresponding to the vehicle model and partially disposing the drop-glass within a glass channel at least partially defined by the window-track, header, and B-pillar components.

20. The method of claim 17 further comprising framing a stationary-glass between a portion of the corner component, header, and window-track, and overmolding a perimeter of the stationary-glass to at least a portion of the corner component, header, and window-track.

* * * * *